Oct. 23, 1951 A. J. STAMM ET AL 2,572,070
METHOD OF STABILIZING WOOD
Filed March 27 1945
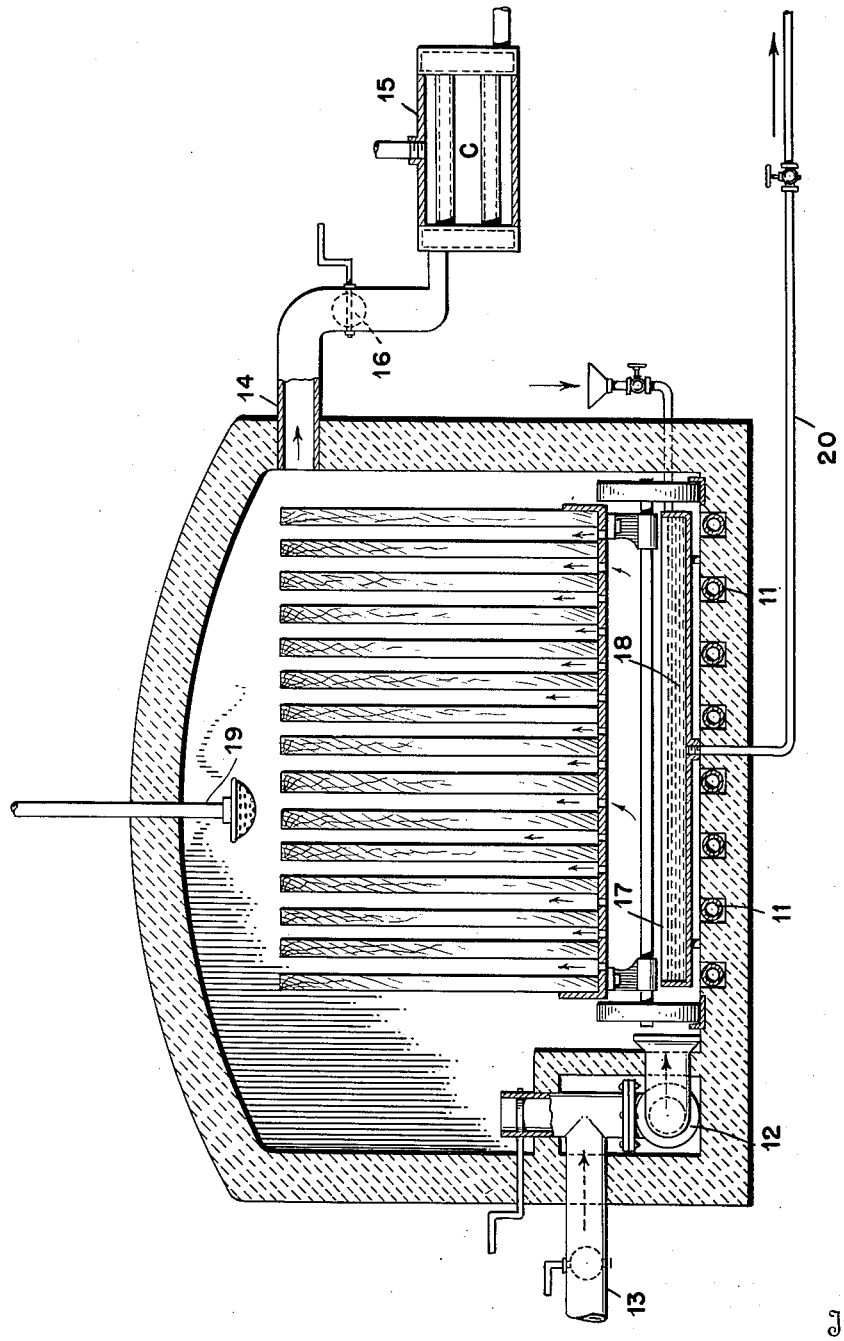
Inventors
A. J. STAMM
H. TARKOW
By *G. J. Kramer*
Attorney Patented Oct. 23, 1951

2,572,070

UNITED STATES PATENT OFFICE 2,572,070

METHOD OF STABILIZING WOOD

Alfred J. Stamm and Harold Tarkow, Madison, Wis., assignors to the United States of America as represented by the Secretary of Agriculture Application March 27, 1945, Serial No. 585,179

5 Claims. (Cl. 117—57)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

The general object of our invention is to reduce the hygroscopicity, equilibrium swelling and shrinking, together with the accompanying splitting and warping of wood and other natural and artificially formed lignocellulosic materials. We accomplish this objective by replacing the available, stereochemically proper, polar hydroxyl groups of the cellulose and the lignin which do not satisfy each other with the less hygroscopic acetal or ketal groups with little breakdown of the structure.

In accordance with our invention, it is possible to react the free hydroxyl groups of the cellulose and the lignin with bridging materials that will tend to cross bond and thereby tie together more firmly the structural components of the solid materials.

Another object of our invention is to reduce the hygroscopicity and tendency of materials of the type mentioned to swell and shrink with the use of a minimum amount of chemical agents.

A further object of our invention is to stabilize lignocellulosic materials in a way that causes less swelling at the time of treatment than with other known dimension-stabilizing treatments, thus avoiding excessive stresses and checking between treated and untreated zones of wood pieces having appreciable size.

We have found that when lignocellulosic materials are relatively free from moisture, they will react with the water-free vapors of aldehydes or ketones, such as formaldehyde, glyoxal, acetaldehyde, benzaldehyde, and acetone, in the presence of a suitable volatile acid catalyst to such an extent as to markedly reduce the hygroscopicity and swelling and shrinking. The equilibrium swelling and shrinking of these various lignocellulosic materials may be reduced to 20 to 60 percent of normal (allowing antishrink efficiencies of 80 to 40 percent) by our method. Aldehydes and ketones in the presence of water or dissolved in organic solvents containing hydroxyl groups do not react sufficiently well with wood and other natural and artificially formed lignocellulosic board materials, even in the presence of acid catalysts, to give appreciable reductions in hygroscopicity.

In the case of treating with formaldehyde, the dry vapor can be generated from substantially dry lumps or powder of paraformaldehyde or other formaldehyde polymers, such as trioxane (in the latter case with acid present) or from these materials dissolved or suspended in an organic liquid which does not contain hydroxyl groups or unsaturated double bonds by heating at 160° to 230° F.

The dry vapors of formaldehyde, glyoxal, acetaldehyde, benzaldehyde, acetone, and other aldehydes and ketones in the presence of a suitable volatile acid catalyst will react sufficiently well for our purpose with dry wood or other lignocellulosic materials at 140° to 230° F., depending on the catalyst used, on the time of contact, and on the nature of the reacting carbonyl compound. We have found hydrogen chloride to be a suitable catalyst for the reaction, although it tends to embrittle the product. Substantially water-free nitric acid is equally suitable for catalyzing the reaction. It embrittles the product somewhat less and is hence preferred to hydrochloric acid.

It is preferred to introduce the acid catalyst into the system after the take-up of aldehyde or ketone is partially complete so as to minimize the time that the lignocellulosic material is in contact with acid vapors, and thus minimize any possible embrittlement caused by the acid. The catalyst may be introduced into the kiln by admitting the acid in a gaseous form or spraying in a liquid or concentrated aqueous solution.

The vapor treatment can be made in a simple chemically resistant kiln, illustrated in the cross-sectional view in the accompanying schematic drawing, equipped with steam coils 11 capable of raising the temperature to 230° F.; a fan 12 for circulating the air; air intake and exhaust ducts 13 and 14, respectively, with a vapor condenser 15 connected to the exhaust duct that can be closed off by damper 16 during the treating steps; a shallow pan 17 mounted just above the steam coils 11 on the floor of the kiln that can be filled with liquid 18 or a suspension of paraformaldehyde and completely drained through a pipe 20 without opening the kiln; and an inlet line 19 for admitting a gaseous catalyst or spraying small quantities of acid catalyst into the kiln. A humidification system (not shown) is needed only when green boards of refractory woods (woods that tend to honeycomb and check excessively when dried) having appreciable size are to be both dried and treated in the same equipment.

The following example will illustrate our invention in more detail and the manner in which it can be carried out without appreciable degradation of the lignocellulosic board material. As the example includes only a few of the possible variations in procedure, we do not wish to limit ourselves to the specific procedures given or to specific details of the kiln.

Example

Birch veneer at any moisture content is stacked on edge in a suitable rack with spacers to hold the individual plies apart. The loaded rack is placed into a chemically resistant air-tight kiln of the type previously described, the load being disposed over the shallow floor pan. The air intake and exhaust ducts are opened, and the veneer is dried to about 2 to 4 percent moisture content according to standard practice with the temperature, humidity, circulation, and exhaust conditions adjusted to give optimum drying without degrading the wood. The air intake and exhaust ducts are then closed and a 30 percent, by weight, suspension of paraformaldehyde in a high boiling point water-free mineral oil that does not contain unsaturated groups is run into the floor pan, the while circulating the air within the kiln between the sheets of veneer and heating to a temperature between 140° and 230° F. After adsorption of formaldehyde vapor by the veneer has taken place for several hours, a small volume of substantially water-free nitric acid is sprayed into the kiln, the while continuing circulation and the application of heat for a total treating time of 8 to 16 hours, or until the increase in oven-dry weight of the veneer due to the formation of acetal groups is between 3 and 6 percent. The suspension is then drained from the floor pan, and the intake and exhaust ducts are opened. Heating of the veneer is continued under circulating and exhaust conditions, condensing the excess of formaldehyde that is removed from the wood to paraformaldehyde in the exhaust condenser.

The liquid to supply the treating vapor in the above example may be water-free glyoxal, paraldehyde, water-free benzaldehyde, or water-free acetone.

Although in the foregoing example, birch veneer is used, other species of veneer and thicker wooden boards or readily treated species in short lengths, and other natural and composition lignocellulosic board materials can be substituted for birch veneer with adjustment in predrying, acetal or ketal forming, and final drying times.

The material may be stickered (spaced with sticks between sheets) in a flat-piled horizontal manner instead of being edge piled.

The lignocellulosic materials should be dried to about 2 to 4 percent moisture content. Appreciably higher moisture content interferes with the desired reaction and promotes undesired hydrolysis.

The concentration of paraformaldehyde suspended in mineral oil can vary over wide limits. The concentration should be high enough to supply somewhat of an excess of formaldehyde over that needed in the reaction (about 15 percent of the weight of the lignocellulosic material) and low enough to permit the suspension to flow into the floor pan. Other formaldehyde polymers, including trioxane, can be substituted for paraformaldehyde. Breakdown to formaldehyde does not occur in the case of such a formaldehyde polymer as trioxane until acid vapor is admitted. Water-free organic liquids other than mineral oil that do not contain hydroxyl or unsaturated groups can be used as the suspending or solvent medium.

Glyoxal polymers may be substituted for the above-mentioned monomeric glyoxal suspended in a water-free organic liquid that does not contain hydroxyl or unsaturated groups.

Other strong volatile acids, such as hydrochloric acid, can be substituted for the nitric acid catalyst. The acid may be admitted as a gas or sprayed into the kiln in the form of a liquid or concentrated aqueous solution.

The acid may be introduced at the same time as the volatile aldehyde or ketone or it may be introduced after the take-up of the aldehyde or ketone by the lignocellulosic material is substantially complete.

The treating time varies with the permeability of the lignocellulosic materials, as it is primarily dependent upon the time necessary for the volatile treating medium to penetrate the structure.

A weight increase of the lignocellulosic material when formaldehyde is used as the treating medium should be about 3 to 6 percent of the dry weight of the lignocellulosic material to reduce adequately the hygroscopicity, swelling, and shrinking. About the same weight increase is desirable when glyoxal is used as the reacting chemical. In the case of other mono-aldehydes and ketones, the weight increase should be greater, about in direct proportion to the molecular weight of the

groups divided by the molecular weight of the

groups, where R and $R_1$ represent organic side chain groups.

The drying step to remove the excess of aldehyde or ketone and the solvent, when one is used, can be carried out under any set of temperature, circulation, and time conditions that will not damage the lignocellulosic material. Temperatures in the range of 160° to 220° F. are satisfactory for most lignocellulosic materials.

Having thus described our invention, we claim:

1. A method of reducing the swelling, shrinking, and hygroscopicity of a piece of wood comprising air drying the piece of wood to a moisture content of 2 to 4 percent, treating the predried piece of wood with water-free vapors of a ketal and acetal group forming reagent taken from the group consisting of formaldehyde, acetaldehyde, glyoxal, benzaldehyde, and acetone, and thereafter contacting the so treated piece of wood with vapor of a mineral acid.

2. A method of reducing the swelling, shrinking, and hygroscopicity of wood veneer comprising air drying the wood veneer to a moisture content of 2 to 4 percent, circulating water-free formaldehyde vapor and air over the dried wood veneer for several hours, thereafter introducing substantially water-free nitric acid, and continuing the circulation, the formaldehyde treatment and the nitric acid treatment being at 140° to 230° F.

3. A method of reducing the swelling, shrinking, and hygroscopicity of wood veneer comprising air drying the wood veneer to a moisture content of 2 to 4 percent, circulating water-free formaldehyde vapor and air over the wood veneer for several hours, thereafter introducing hydrochloric acid vapor and continuing the circulation, the formaldehyde treatment and the hydrochloric acid treatment being at 140° to 230° F.

4. A process for the dimensional stabilization of wood comprising treating wood, predried to a moisture content of 2 to 4%, with water-free vapor of formaldehyde and a strong mineral acid.

5. The process of claim 4 in which the acid is hydrochloric acid.

ALFRED J. STAMM.
HAROLD TARKOW.

REFERENCES CITED

The following references are of record in the file of this patent:

UNITED STATES PATENTS

| Number | Name | Date |
|---|---|---|
| 1,210,491 | Kleinstuck | Jan. 2, 1917 |
| 1,816,973 | Kantorowicz | Aug. 4, 1931 |
| 1,857,263 | Sponsel et al. | May 10, 1932 |
| 2,108,520 | Wolf et al. | Feb. 15, 1938 |
| 2,243,765 | Morton | May 27, 1941 |
| 2,273,039 | Hudson | Feb. 17, 1942 |
| 2,330,826 | Hund | Oct. 5, 1943 |

OTHER REFERENCES

Hackh's Chemical Dictionary 3rd ed., pages 5 and 468.